United States Patent
Crabb et al.

(10) Patent No.: US 11,607,869 B2
(45) Date of Patent: *Mar. 21, 2023

(54) MULTILAYER POLYMERIC STRUCTURE

(71) Applicant: TRINSEO EUROPE GMBH, Horgen (CH)

(72) Inventors: Charles C. Crabb, Royersford, PA (US); Thomas H. Richards, New Britain, PA (US); Steven B. Lacock, Perkiomenville, PA (US); Florence Mehlmann, Berwyn, PA (US)

(73) Assignee: Trinseo Europe GmbH, Pfaeffikon (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/391,240

(22) PCT Filed: Apr. 3, 2013

(86) PCT No.: PCT/US2013/035067
§ 371 (c)(1),
(2) Date: Oct. 8, 2014

(87) PCT Pub. No.: WO2013/154877
PCT Pub. Date: Oct. 17, 2013

(65) Prior Publication Data
US 2015/0111014 A1  Apr. 23, 2015

Related U.S. Application Data

(60) Provisional application No. 61/623,779, filed on Apr. 13, 2012.

(51) Int. Cl.
| B32B 27/08 | (2006.01) |
| B32B 7/12 | (2006.01) |
| B32B 27/32 | (2006.01) |
| B32B 25/14 | (2006.01) |
| B32B 27/30 | (2006.01) |
| B32B 25/16 | (2006.01) |
| B32B 25/08 | (2006.01) |

(52) U.S. Cl.
CPC ............... *B32B 27/08* (2013.01); *B32B 7/12* (2013.01); *B32B 25/08* (2013.01); *B32B 25/14* (2013.01); *B32B 25/16* (2013.01); *B32B 27/302* (2013.01); *B32B 27/32* (2013.01); *B32B 2250/03* (2013.01); *B32B 2250/24* (2013.01); *B32B 2250/246* (2013.01); *B32B 2270/00* (2013.01); *B32B 2274/00* (2013.01); *B32B 2307/54* (2013.01); *B32B 2307/554* (2013.01); *B32B 2307/558* (2013.01); *B32B 2307/71* (2013.01); *B32B 2307/738* (2013.01); *B32B 2325/00* (2013.01); *B32B 2355/02* (2013.01); *B32B 2509/00* (2013.01); *B32B 2605/00* (2013.01); *B32B 2605/003* (2013.01); *Y10T 428/24967* (2015.01); *Y10T 428/2967* (2015.01); *Y10T 428/31913* (2015.04); *Y10T 428/31917* (2015.04)

(58) Field of Classification Search
CPC ..... Y10T 428/24967; Y10T 428/31913; Y10T 428/31917; B32B 27/08; B32B 2250/03; B32B 2250/24; B32B 2250/246; B32B 2270/00; B32B 2274/00; B32B 2307/738; B32B 2509/00; B32B 25/14; B32B 2605/00; B32B 2605/003; B32B 27/32; B32B 7/12
USPC ........................................................ 428/215
See application file for complete search history.

(56) References Cited

U.S. PATENT DOCUMENTS

| 3,177,269 A * | 4/1965 | Nowak ................. C08F 255/00 525/263 |
| 4,440,824 A * | 4/1984 | Bonis ....................... B32B 27/08 428/216 |
| 4,939,009 A * | 7/1990 | Beavers .................. B32B 27/08 428/35.2 |
| 5,017,436 A | 5/1991 | Schwarz et al. |
| 5,264,280 A | 11/1993 | Chundury et al. |
| 5,306,548 A * | 4/1994 | Zabrocki ................. B32B 27/08 264/176.1 |
| 5,310,584 A * | 5/1994 | Jacoby et al. ..................... 428/2 |

(Continued)

FOREIGN PATENT DOCUMENTS

| WO | WO 03040442 A1 * | 5/2003 | ............. B32B 27/32 |
| WO | WO2013/070502 | 5/2013 | |

OTHER PUBLICATIONS

Versify-Containers & Storage, The Dow Chemical Company copyright 1995-2016.*

(Continued)

*Primary Examiner* — Alicia J Sawdon
(74) *Attorney, Agent, or Firm* — RatnerPrestia

(57) ABSTRACT

The invention relates to multilayer polymer structures having at least three layers. These layers include a polar capstock layer other than an acrylic, an olefinic substrate layer, and a tie layer. The tie layer is selected from olefinic acrylate copolymers, a block copolymer of vinyl aromatic monomer with an aliphatic conjugated diene or a derivative thereof, a copolymer of olefin and (meth)acrylic acid partially or fully in the salt form, a high impact polystyrene, and/or a vinyl cyanide-containing compound. Each layer could contain multiple sub-layers. The multilayer structure exhibits excellent structural integrity, excellent surface appearance, high impact strength, high scratch resistance, and excellent resistance to UV rays.

8 Claims, No Drawings

(56) References Cited

U.S. PATENT DOCUMENTS

| | | | |
|---|---|---|---|
| 5,374,680 A | 12/1994 | Chundury et al. | |
| 5,385,781 A | 1/1995 | Chundury et al. | |
| 6,420,050 B2 | 7/2002 | Birch et al. | |
| 6,455,171 B2 | 9/2002 | Scheibelhoffer et al. | |
| 2002/0001730 A1* | 1/2002 | Scheibelhoffe | B32B 27/08 428/517 |
| 2002/0025420 A1* | 2/2002 | Wanat | B32B 27/08 428/213 |
| 2002/0055587 A1* | 5/2002 | Lau et al. | 525/81 |
| 2003/0099840 A1* | 5/2003 | Dey | B32B 7/12 428/421 |
| 2004/0253468 A1* | 12/2004 | Donnelly | B32B 27/32 428/515 |
| 2005/0031822 A1* | 2/2005 | Aihara | B32B 27/32 428/40.1 |
| 2006/0014036 A1* | 1/2006 | Kendig | B32B 1/02 428/522 |
| 2007/0190333 A1* | 8/2007 | Matsugi et al. | 428/420 |
| 2008/0145670 A1* | 6/2008 | Song et al. | 428/420 |
| 2008/0220274 A1 | 9/2008 | Cohen et al. | |
| 2008/0248294 A1 | 10/2008 | Cohen et al. | |
| 2008/0254308 A1* | 10/2008 | Thomasson | B32B 7/12 428/516 |
| 2009/0220757 A1* | 9/2009 | Patel | B32B 27/08 428/212 |
| 2009/0241450 A1* | 10/2009 | Italiane et al. | 52/309.3 |
| 2014/0147644 A1 | 5/2014 | Crabb et al. | |

OTHER PUBLICATIONS

Instron: Modulus of Elasticity accessed Jun. 19, 2017.*
Wypych (Handbook of Polymers, ChemTec Publishing, pp. 14-17, 2012).*
What is a polyolefin? (http://www.materials-talks.com/blog/2017/03/26/what-are-polyolefins/) accessed Jan. 3, 2017.*
Compton, R.G. ed; Comprehensive Chemical Kinetics, vol. 31, Elsevier; Ch. 1 (Year: 1992).*

* cited by examiner

MULTILAYER POLYMERIC STRUCTURE

This application claims benefit, under U.S.C. § 119 or § 365 of PCT Application Number PCT/US2013/035067, filed Apr. 3, 2013, and U.S. Provisional Application No. 61/623,779, filed Apr. 13, 2012, said applications incorporated herein by reference.

FIELD OF THE INVENTION

The invention relates to multilayer polymer structures having at least three layers. These layers include a polar capstock layer other than an acrylic, an olefinic substrate layer, and a tie layer. The tie layer is selected from olefinic acrylate copolymers, a block copolymer of a vinyl aromatic monomer with an aliphatic conjugated diene, a copolymer of olefin and (meth)acrylic acid partially or fully in the salt form, a high impact polystyrene, and/or a vinyl cyanide-containing compound. Each layer could contain multiple sub-layers. The multilayer structure exhibits excellent structural integrity, excellent surface appearance, high impact strength, high scratch resistance, and excellent resistance to UV rays.

BACKGROUND OF THE INVENTION

Multi-layered polymeric structures are useful to take advantage of the properties of the different polymers. The multi-layer structures (or sheets) are found in parts used in many industries, including the automotive industry; communications such as telephones, radio, TV, cassettes, etc.; power tools; appliances; business machines; toys; furniture; medical devices, building and construction, etc. When preparing multilayer structures, the layers of the structures must adhere securely to each other. If the layers of the structure do not adhere to each other, a special adhesive, or a tie layer, may be used to join the layers of the multilayer structure together.

The multilayer structures of the invention may be produced by any methods available in the art, such as by co-extrusion techniques, lamination techniques, thermoforming, injection molding, blow molding, or any combination thereof. Co-extrusion is a process in which two or more molten polymeric compositions are simultaneously extruded through a feedblock die or, alternatively, through a multi-manifold die, to form a laminar structure with different functional properties in each layer. A feedblock die can be used to feed a multi-manifold die in a single process, to provide excellent flexibility in the manufacture of the multilayer structures. Lamination is the process of bonding together prefabricated sheet or film layers, or prefabricated and extruded sheet or film layers, by the use of adhesives, or by a combination of heat and pressure. Alternatively, hot melt lamination or thermal lamination brings two or more molten polymer layers together outside the extrusion die, usually at a nip roll or at the top roll of a roll stack.

Multilayer structures formed by blends of different polymer compositions are known in the prior art.

Examples of multilayer structures having styrenic cap layers and olefinic core layers include those disclosed in U.S. Pat. Nos. 5,264,280, 5,374,680 and 5,385,781.

U.S. Pat. Nos. 6,455,171, U.S. Pat. No. 6,420,050, and U.S. 2008/0220274 disclose multilayer structures which provide the physical properties of an olefinic core layer and the scratch and chemical resistive properties of an acrylic cap layer. The tie layers disclosed are either an olefinic acrylate copolymer, or a block copolymer of vinyl aromatic monomer with aliphatic conjugated diene, partially hydrogenated diene, or olefin monomer. U.S. Pat. No. 7,740,951 discloses a similar olefin-based substrate, an acrylic cap layer, and a tie layer using a blend of a styrenic block copolymer with a vinyl cyanide-containing compound.

Unfortunately, none of the described tie-layers, by themselves, result in sufficient adhesion to both the olefin substrate and the cap layers, while also affording high quality sheet surface. Efforts to optimize such compositions can improve adhesion to one layer, but simultaneously reduce the adhesion to the other layer. Specific epoxy-functionalized polyolefin-acrylate copolymers have shown satisfactory adhesion to both layers; however the presence of gels in this type of materials resulted in a structure with unacceptable surface appearance.

U.S. Pat. No. 5,082,742 discloses a structure with an olefinic substrate layer attached to a thermoplastic resin using either a two-layer tie having a functional thermoplastic and a functional polyolefin, or a single layer tie that is a blend of a functional thermoplastic and a functional polyolefin. Functional groups are specifically chosen to be co-reactive in processing conditions used to produce the tie-layer.

Surprisingly, it has now been found that a tie layer that does not contain co-reactive functional groups, can be used to provide excellent adhesion of a polar cap layer, that is not an acrylic, to an olefinic substrate layer. The useful tie layer is selected from olefinic acrylate copolymers, a block copolymer of vinyl aromatic monomer with an aliphatic conjugated diene, which can be partially or fully hydrogenated diene, and where the dienes can be functionalized, a copolymer of olefin and (meth)acrylic acid partially or fully in the salt form, a high impact polystyrene, a vinyl cyanide-containing compound, and blends thereof. The result of using the novel tie layer between the polyolefin and polar cap layers is a multilayer structure which displays enhanced structural integrity, as well as excellent surface appearance.

SUMMARY OF THE INVENTION

The invention relates to a multi-layer thermoformable structure having:
a) at least one polyolefin-based layer,
b) at least one polar, non-acrylic layer, and
c) at least one tie layer having one or more polymers selected from the group consisting of olefinic acrylate copolymers, block copolymers of vinyl aromatic monomer with an aliphatic conjugated diene, copolymers of olefin and (meth)acrylic acid partially or fully in the salt form, high impact polystyrene, and vinyl cyanide-containing compound, where the tie layer is directly adjacent to, and in between the polyolefin-based layer and the polar non-acrylic layer.

The invention also relates to article formed from the multi-layer structure.

DETAILED DESCRIPTION OF THE INVENTION

All percentages used herein are weight percentages unless stated otherwise, and all molecular weights are weight average molecular weights determined by gel permeation chromatography unless stated otherwise. All references listed are incorporated herein by reference.

The invention relates to a multilayer polymer structure containing at least a capstock layer, a tie layer, and a substrate layer.

Capstock

The multilayer structure of this invention contains at least one polar capstock layer that is non-acrylic. Polar capstock layer polymers include, but are not limited to, styrenic-based polymers, polyesters, polycarbonate, polyvinylidene fluoride, and thermoplastic polyurethane (TPU). Preferred capstock layer polymers are styrenic-based.

Styrenic-based polymers include, but are not limited to, polystyrene, high-impact polystyrene (HIPS), acrylonitrile-butadiene-styrene (ABS) copolymers, acrylonitrile-styrene-acrylate (ASA) copolymers, styrene acrylonitrile (SAN) copolymers, methacrylate-acrylonitrile-butadiene-styrene (MABS) copolymers, styrene-butadiene copolymers (SB), styrene-butadiene-styrene block (SBS) copolymers and their partially or fully hydrogenenated derivatives, styrene-isoproene copolymers styrene-isoprene-styrene (SIS) block copolymers and their partially or fully hydrogenated derivatives, and styrene-(meth)acrylate copolymers such as styrene-methyl methacrylate copolymers (S/MMA). A preferred styrenic polymer is ASA. The styrenic polymers of the invention can be manufactured by means known in the art, including emulsion polymerization, solution polymerization, and suspension polymerization. Styrenic copolymers of the invention have a styrene content of at least 10 percent by weight, preferably at least 25 percent by weight.

In one embodiment, the capstock layer polymer has a weight average molecular weight of between 50,000 and 500,000 g/mol, and preferably from 75,000 and 150,000 g/mol, as measured by gel permeation chromatography (GPC). The molecular weight distribution of the acrylic polymer may be monomodal, or multimodal with a polydispersity index greater than 1.5.

In one embodiment, the multilayer structure of the invention contains two or more polar capstock layers, and two or more tie layers, such as a five- layer structure of polar capstock/tie layer/polyolefin-based polymer/tie layer/polar capstock layer. The structure could have different polar cap layers on each side. In a structure in which multiple polar capstock layers and/or multiple tie layers are used in layers non-adjacent to each other, the polar capstock layers and tie layers can be of the same of different compositions, though in a preferred embodiment the multiple polar capstock layers and tie layers are the same. In another embodiment, the polar capstock layers may be composed of two or more polar layers in contact with each other. In another embodiment, the tie-layer may be composed of two or more tie layers directly in contact with each other.

The capstock layer of the invention has a thickness of from 0.025 to 3 mm, and preferably from 0.075 to 0.5 mm.

Substrate

The polyolefin-based layer, herein also referred to as a substrate layer, is thicker than the capstock layer(s) and tie layer(s) combined. The polyolefin-based layer provides a layer with a good balance of stiffness and impact resistance, excellent processability, and relatively lower cost. It could contain one or more different polyolefin layers, and a polyolefin layer could be a blend of two or more different polyolefins. The polyolefins employed in the semicrystalline or crystallizable olefin polymers can be homopolymers, copolymers, terpolymers, or mixtures thereof, etc., containing one or more olefin monomeric units. In a polyolefin-based layer, the polyolefins are generally present in an amount from 30 to 100% by weight, preferably at least 55%, and more preferably at least 60% by weight. The polyolefin of this invention excludes cyclic olefin copolymer (COCs). It is common for one or more of the polyolefin layers to contain rework—material that has already been processed into an article, such as a film or sheet. The rework polyolefin is then granulated and blended with virgin polyolefin prior to re-extrusion. The rework may contain non-polyolefin components.

Polymers of alpha-olefins or 1-olefins are preferred in the present invention, and these alpha-olefins may contain from 2 to about 20 carbon atoms. Alpha-olefins containing 2 to about 6 carbon atoms are preferred. Thus, the olefin polymers may be derived from olefins such as ethylene, propylene, 1-butene, 1-pentene, 4-methyl-1-pentene, 1-octene, 1-decene, 4-ethyl- 1-hexene, etc. Examples of polyolefins include polypropylene, polyethylene, and ethylene propylene copolymers.

In one embodiment, the polyolefins include polypropylene and ethylene-propylene polymers. Propylene polymers may be semi-crystalline or crystalline in structure. The number average molecular weight of the propylene polymers is preferably above about 10,000 and more preferably above about 50,000. In addition, it is preferred in one embodiment that the apparent crystalline melting point be above about 75° C. and preferably between about 75° C. and about 250° C. The propylene polymers useful in the present invention are well-known to those skilled in the art and many are available commercially. Polypropylene are the preferred propylene polymers.

Thermoplastic polyolefins (TPO) are an especially preferred substrate layer. A thermoplastic polyolefin (TPO) composition is defined as a two-phase melt blend containing a continuous phase of at least one semi-crystalline polypropylene component and a dispersed phase containing at least one substantially amorphous elastomer component. The elastomer component typically includes at least one ethylene/alpha-olefin copolymer, at least one styrenic block copolymer, or a mixture thereof. Preferred thermoplastic polyolefin materials provide a beneficial balance of stiffness (e.g., flexural modulus typically ranging from 270-2900 MPa), as well as impact resistance (e.g., ductile at room temperature, preferably ductile at −30° C.), yet are melt processable with most conventional thermoplastic processing equipment. Preferably, the polyolefin-based substrate layer component is further characterized by a density typically of from 0.813 g/cm.sup.3 to 1.305 g/cm$^3$.

In one embodiment, the multilayer structure of the invention contains two or more substrate layers.

Tie layer

Tie layers useful in the present invention are composed of one or more polymers selected from olefinic acrylate copolymers, copolymers of olefin and (meth)acrylic acid which can be partially or fully in the salt form, a high impact polystyrene, vinyl cyanide-containing compounds, and block copolymers of vinyl aromatic monomer with aliphatic conjugated diene, which can be partially or fully hydrogenated and where the dienes can be functionalized.

In one embodiment, the tie-layer of the invention comprises a blend of two or more block copolymers of vinyl aromatic monomer with aliphatic conjugated diene, which can be partially or fully hydrogenated and where the dienes can be functionalized. A preferred tie-layer composition comprises a blend of block copolymers having less than about 50 weight % bound vinyl aromatic monomer and block copolymers having greater than about 60 weight % bound vinyl aromatic monomer.

In another embodiment, the tie layer has a high tensile modulus of greater than 50 psi, preferably greater than 100 psi, more preferably greater than 200 psi, more preferably greater than 300 psi, more preferably greater than 400 psi, and most preferably greater than 500 psi, as measured by ASTM D638.

If the tie-layer comprises a copolymer of olefin and (meth)acrylic acid partially or fully in the salt form, the salt cation is preferably selected from the group of, sodium, potassium, calcium, zinc, lithium, magnesium, and barium.

The olefin acrylate copolymer can be made by any method known in the art, including but not limited to high pressure autoclaves and tubular reactors, and can have homogeneous or heterogeneous distributions of compositions and molecular weights.

In the multi-layer structure of the invention, the tie layer and acrylic layers range in thickness from 0.025 to 2.5 mm, and preferably from 0.05 to 1 mm in thickness.

The polar capstock layer(s), polyolefin-based substrate layer(s) and tie layers may contain one or more impact modifiers, fillers or fibers, or other additives of the type used in the polymer art. Examples of impact modifiers include, but are not limited to, core-shell particles and block or graft copolymers. Examples of additives include, for example, UV light inhibitors or stabilizers, lubricant agents, heat stabilizers, flame retardants, synergists, pigments and other coloring agents. Examples of fillers employed in a typical compounded polymer blend according to the present invention include talc, calcium carbonate, mica, matting agents, wollastonite, dolomite, glass fibers, boron fibers, carbon fibers, carbon blacks, pigments such as titanium dioxide, or mixtures thereof. Examples of matting agents include, but are not limited to, cross-linked polymer particles of various geometries, The amount of filler and additives included in the polymer compositions of each layer may vary from about 0.01% to about 70% of the combined weight of polymer, additives and filler. Generally amounts from about 5% to about 45%, preferably from about 10% to about 40%, are included.

The fillers may be treated with coupling agents to improve the bond between the fillers to the resin. For example, the fillers can be treated with materials such as fatty acids (e.g., stearic acid), silanes, maleated polypropylene, etc. The amount of coupling agent used is an amount effective to improve the bond between the fillers with the resin.

Manufacture

The multi-layer structure of the invention can contain three or more layers, with the choice of the number and composition of the layers being adjusted to meet the needs of the end-use application. The structure can be made by any method known to the art. This includes separate formation of the layers followed by lamination, coextrusion of all layers—which is preferred, or a combination of coextrusion and lamination. This also includes multi-shot injection molding, blow molding and insert molding.

The multilayered polymeric structure of the present invention may be either processed directly into any geometric shape, such as a profile, or may be first processed into a planar shape and then further shaped into a three-dimensional part by any suitable method. Thermoforming, for example, is the process of heating a plastic material in film or sheet form to its particular processing temperature and forming the hot and flexible material against the contours of a mold by mechanical or pneumatic means.

The multilayer structure can have any given geometry, including but not limited to, a flat sheet, a rod, or a profile. The multilayer structure exhibits excellent structural integrity, excellent surface appearance, high impact strength, high scratch resistance, and excellent resistance to UV rays.

EXAMPLES

The following sheet structures were prepared on a laboratory coextrusion line using a triple manifold die:

|  | Example 1 | Example 2 (Comparative) | Example 3 | Layer Thickness |
|---|---|---|---|---|
| Capstock | ASA[1] | ASA[1] | PMMA[4] | 6 mil |
| Tie Layer | Olefin-Acrylic Copolymer[2] | None | Olefin-Acrylic Copolymer[2] | 12 mil |
| Substrate | TPO[3] | TPO[3] | TPO[3] | 90 mil |

[1]LURAN SE UV 797 Natural from Styrolution.
[2]PRD-940B from Arkema, Inc.
[3]METAFORM 7200 from Mytex Polymers.
[4]SOLARKOTE A200 from Arkema, Inc.

After coextrusion, the composite sheet was cut into 1" wide strips and adhesion between the capstock and substrate was measured using a 90° peel test as described in ASTM 6862-04.

The following results were obtained:

|  | Peel Strength |
|---|---|
| Example 1 | 15.9 lbf/in |
| Example 2 | <2 lbf/in |
| Example 3 | 17.2 lbf/in |

Example 1 displays excellent adhesion between the layers. In contrast, example 2, having no tie layer present, exhibits very little adhesion. This demonstrates the usefulness of using an olefin-acrylic copolymer as a tie layer for coextruding styrenics such as ASA over polyolefins such as TPO. Examples 1 and 3 exhibits similar adhesion, the choice of acrylic-based polymers or styrenic-based polymers as a capstock layer depends on the end-application requirements, in terms of cost and physical properties (hardness, gloss, impact)

What is claimed is:
1. A multi-layer thermoformable polymer structure or sheet comprising:
   a) at least one thermoplastic polyolefin substrate layer,
   b) at least one styrenic-based polymer capstock layer, having a thickness of from 0.075 to 2.5 mm, wherein said styrenic-based polymer is selected from the group consisting of polystyrene, high-impact polystyrene (HIPS), acrylonitrile-butadiene-styrene (ABS) copolymers, acrylonitrile-styrene-acrylate (ASA) copolymers, styrene acrylonitrile (SAN) copolymers, methacrylate-acrylonitrile-butadiene-styrene (MABS) copolymers, styrene-butadiene copolymers (SB), styrene-butadiene-styrene block (SBS) copolymers and their partially or fully hydrogenated derivatives, styrene-isoprene copolymers, styrene-isoprene-styrene (SIS) block copolymers and their partially or fully hydrogenated derivatives, and styrene-methyl methacrylate copolymers (S/MMA), and
   c) a tie layer, having a thickness of from 0.05 to 1 mm, consisting of copolymers selected from the group consisting of olefinic acrylate copolymers having a homogeneous or heterogeneous distribution of compositions and molecular weights, copolymers of olefin and (meth)acrylic acid which can be partially or fully in the salt form, and mixtures thereof, wherein said tie layer has a tensile modulus of greater than 300 psi, as measured by ASTM D638, wherein the tie layer is directly adjacent to, and in between the at least one polyolefin-based substrate layer and the at least one styrenic-based polymer layer, wherein the layers a), b) and c) are coextruded together, and wherein said at least one substrate layer is thicker than said at least one capstock layer and tie layer combined, and wherein the thermoplastic polyolefin of the at least one substrate layer contains at least one polypropylene component and at least one elastomer component, where the at least one elastomer component includes at least one ethylene/alpha-olefin copolymer, at least one styrenic block copolymer, or a mixture thereof.

2. The multi-layer thermoformable structure of claim 1, wherein said at least one styrenic-based polymer layer has a weight average molecular weight of between 50,000 and 500,000 g/mol, as measured by gel permeation chromatography.

3. The multi-layer thermoformable structure of claim 1, wherein said at least one styrenic-based polymer comprises acrylonitrile-styrene-acrylate (ASA) copolymers.

4. The multi-layer thermoformable structure of claim 1, wherein said at least one styrenic-based polymer layer further comprises one or more impact modifiers, fillers, and/or fibers.

5. The multi-layer thermoformable structure of claim 1, wherein said tie layer has a tensile modulus of greater than 500 psi, as measured by ASTM D638.

6. An article formed from the thermoformable structure of claim 1.

7. The article of claim 6 in the form of a flat sheet, a rod, or a profile.

8. The article of claim 6 formed by a process selected from lamination, coextrusion, multi-shot injection molding, and insert molding.

\* \* \* \* \*